(12) United States Patent
Liu et al.

(10) Patent No.: US 6,842,288 B1
(45) Date of Patent: Jan. 11, 2005

(54) MULTILAYER OPTICAL ADHESIVES AND ARTICLES

(75) Inventors: Yaoqi Joe Liu, Shoreview, MN (US); Robert L. Brott, Woodbury, MN (US); Jeffrey J. Cernohous, Hudson, WI (US); Ying-Yuh Lu, Woodbury, MN (US); Robert S. Moshrefzadeh, Oakdale, MN (US); Kevin R. Schaffer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/696,981

(22) Filed: Oct. 30, 2003

(51) Int. Cl.[7] ................................................. G02B 1/10
(52) U.S. Cl. ....................... 359/586; 359/582; 359/588; 428/214
(58) Field of Search ................................ 359/582, 586, 359/588; 428/354, 214

(56) References Cited

U.S. PATENT DOCUMENTS

| | | | |
|---|---|---|---|
| 4,260,659 A | 4/1981 | Gobran | |
| 4,737,559 A | 4/1988 | Kellen et al. | |
| 4,894,259 A | 1/1990 | Kuller | |
| 4,931,347 A | 6/1990 | Slovinsky et al. | |
| 5,037,579 A | 8/1991 | Matchett | |
| 5,047,196 A | 9/1991 | Zuckerberg et al. | |
| 5,252,694 A | 10/1993 | Willett et al. | |
| 5,427,842 A | 6/1995 | Bland et al. | |
| 5,527,595 A | 6/1996 | Slovinsky et al. | |
| 5,593,786 A | * 1/1997 | Parker et al. | 428/426 |
| 5,644,007 A | 7/1997 | Davidson et al. | |
| 6,045,895 A | 4/2000 | Hyde et al. | |
| 6,207,260 B1 | 3/2001 | Wheatley et al. | |
| 6,280,845 B1 | 8/2001 | Kollaja et al. | |
| 6,288,172 B1 | 9/2001 | Goetz et al. | |
| 6,296,927 B1 | 10/2001 | Jonza et al. | |
| 6,379,791 B1 | 4/2002 | Cernohous et al. | |
| 6,398,370 B1 | 6/2002 | Chiu et al. | |
| 6,416,838 B1 | 7/2002 | Arney et al. | |
| 6,579,601 B2 | 6/2003 | Kollaja et al. | |
| 6,663,978 B1 | 12/2003 | Olson et al. | |
| 2003/0192638 A1 | 10/2003 | Yang et al. | |

FOREIGN PATENT DOCUMENTS

| | | |
|---|---|---|
| EP | 0942054 A1 * | 9/1999 |
| WO | WO 84/03837 | 10/1984 |
| WO | WO 99/28124 | 6/1999 |
| WO | WO 99/28128 | 6/1999 |
| WO | WO 00/06495 | 2/2000 |
| WO | WO 01/30933 A1 | 5/2001 |

* cited by examiner

*Primary Examiner*—Drew A. Dunn
*Assistant Examiner*—Leo Boutsikaris
(74) *Attorney, Agent, or Firm*—Douglas B. Little

(57) ABSTRACT

Described are multilayer optical composites including a first layer having an index of refraction $n_1$, an $i^{th}$ layer having an index of refraction $n_i$ greater than $n_1$, and one or two or more intermediate layers between the first layer and the $i^{th}$ layer, wherein the indices of refraction of the intermediate layers are between $n_1$ and $n_i$, and the index of refraction of each intermediate layer increases in the order of position of each layer from the first layer.

34 Claims, 1 Drawing Sheet

MULTILAYER OPTICAL ADHESIVES AND ARTICLES

FIELD

The invention relates to multilayer optical adhesives and products, as well as related methods.

BACKGROUND

Multilayer films and their products are pervasive in modern commercial and consumer applications, due to advantages and synergisms produced by forming layers of different materials into a single composite film. Advantages available with multilayer constructions include mechanical strength, tear or puncture resistance, and desirable optical properties. Multilayer optical products in particular are used in products such as computers, touch screen displays, other electronic devices, window films, diffusers, polarizers, and mirrors, to name a few.

Multilayer products are sometimes formed together (e.g., co-extruded), are sometimes laminated from separate pre-formed film layers into a multilayer film construction, and are sometimes placed together and kept in contact using an adhesive layer that may have optical properties. Certain adhesive materials having optical properties such as good clarity or transmissivity are known, including pressure sensitive adhesives, structural adhesives, and combinations such as structural-pressure sensitive adhesive hybrids.

Certain layers of a multilayer optical product having non-optical functions such as adhesive layers can negatively affect optical properties of a multilayer composite such as clarity, resolution, contrast, or transmissivity, or cause such negative optical effects as ghosting, haloing, or causing an increased reflection of the optical product due to interfacial reflection.

There is ongoing need for optical products with useful and improved optical properties such as high clarity, transmissivity, contrast, resolution, a lack of ghosting or haloing, and low reflectivity, for use in a variety of optical applications.

SUMMARY

The invention relates to multilayer optical products with low reflectivity. Layers of multilayer optical products are selected at least in part for properties of high transmissivity and preferably low reflectivity. High transmissivity of at least certain wavelengths of electromagnetic radiation is desired. Reflectivity reduces transmissivity and occurs to at least some degree in all optical films. In multilayer composites, an interface between two layers of different materials will reflect radiation. Radiation passing through one layer of the composite, reaching the interface, may be partially reflected instead of transmitted through the next layer. The amount of reflection is relatively higher where adjacent materials of the interface have relatively greater differences in their indices of refraction (i.e., a relatively greater difference in the indices of refraction of the adjacent layers causes more reflectivity, while a relatively lower or no difference in index of refraction causes less reflectivity).

The invention relates to multilayer optical composites designed to be transmissive to selected wavelengths of electromagnetic radiation, e.g., visible wavelengths, with low reflectivity of the same wavelengths. According to the invention, adjacent layers of a multilayer composite can be selected to have indices of refraction that reduce reflectivity that would occur at interfaces along the thickness of the composite. The invention relates to selecting the indices of refraction of adjacent layers to be near each other, preferably as near as possible, and placing layers in an order to reduce reflectivity. Preferably, a layer of a multilayer optical composite can have an index of refraction value that is close to the value of its adjacent layer or layers, and the index of refraction of layers of the composite can gradually increase or decrease according to the position of a layer within the composite, e.g., each layer between two other layers can have an index of refraction that is higher than one adjacent layer and lower than the other. This reduces reflectivity at interfaces, substantially reducing overall reflectivity along the thickness of a multilayer composite, especially if several or many layers are placed next to each other with each layer sequentially, e.g., monotonically, having a gradually changing index of refraction from one layer to each adjacent layer along the stack. The optical properties of the composite also can exhibit improved clarity, improved resolution, reduced distortion, and reduced haloing and ghosting, compared to composites that do not use intermediate layers having changing indices of refraction as described.

The difference in the indices of refraction of different layers can preferably change gradually with multiple separate layers of a multilayer composite, e.g., increasing or decreasing monotonically. The amount of difference in index of refraction between adjacent layers can depend on the total difference in index of refraction between distant layers and the total number of layers.

The invention can be particularly useful for designing optical products having two optically functional components (e.g., non-adhesive optical components included in the composite at least in part for their optical properties) of different indices of refraction, such as a diffuser, a glass layer, a polymeric optical component such as a polyester film, a conductive layer, etc. In such applications, the invention allows for reducing reflectivity between two optical component layers. The invention accomplishes reduced reflectivity by placing intermediate layers with useful optical properties such as transmissivity, clarity, and refractive index, (e.g., a multilayer optical adhesive as described herein) between the optical component layers. The indices of refraction of the intermediate layers can gradually change from matching or approximating the index of refraction of one of the optical components to matching or approximating the index of refraction of the other optical component. The total reflectivity that occurs at the interfaces of the intermediate layers can be less than the reflectivity that would occur if the two optical components were placed directly adjacent to each other, either in contact with each other or if an air layer is present between the two optical components. A number of intermediate layers with gradual, small, differences in their indices of refraction, can provide a substantial reduction in reflectivity. In particular embodiments of the invention, one or multiple of the intermediate layers can be optical adhesive layers, e.g., the intermediate layers can form a multi-layer optical adhesive.

The materials used for the layers of the optical product can be any materials useful in optical products, preferably having high transmissivity of desired wavelengths, and preferably having desired mechanical, adhesive, conductive, polarizing, diffusing, or other mechanical or optical properties. An optical component layer may be of a material such as glass, an organic polymeric material such as a polyester, polycarbonate, or another organic or inorganic material. An optical component layer can be coated (especially a surface layer) to produce a desired optical, electrical, or other effect.

Layers designed as intermediate, e.g., adhesive layers or multiple adhesive layers to form a multi-layer optical adhesive, can bond optical component layers to one another while still providing useful optical properties. Adhesives may be of materials that exhibit structural or pressure sensitive adhesive properties.

Any of the different layers may also be of a material chosen to exhibit a desired mechanical property or a specific index of refraction that meets a need of an intermediate layer of a composite. The invention can be particularly useful with highly transmissive optical composites where clarity, transmissivity, resolution, reduced distortion, and avoidance of ghosting or haloing are important, e.g., conductive composites for use in a touch screen display.

The index of refraction of intermediate layers can be controlled by selecting a material for each layer that provides a sequence or series of layers having indices of refraction that gradually change, e.g., monotonically, along the thickness of the composite based on the composition of each layer. Many polymeric materials of varying indices of refraction are known to have optical properties and to be useful in multilayer optical products. Any such known or future developed material may be placed in an optical composite according to the invention, based on its index of refraction, at a location in the composite between other layers having a higher index of refraction and a lower index of refraction. The different layers may be of similar or distinct chemistries.

Multiple materials will be needed for a series of layers of a multilayer optical product with different indices of refraction, preferably but not necessarily, one material and one index of refraction for each layer. One technique useful to produce multiple materials having different indices of refraction is to begin with two or more different materials, and to combine the different materials in different amounts to produce layers of materials having gradually changing indices of refraction for each combination. Examples of such techniques include to start with a single polymeric material and to add gradually more or less of a filler or additive (e.g., nanoparticles) that will gradually increase or decrease the index of refraction of the starting material. These mixtures or blends of materials may be very close in composition, but can vary enough to vary indices of refraction for use in different layers. Another example of a technique to produce materials of varying indices of refraction is to combine different polymeric materials of known indices of refraction, preferably in gradually, e.g., regularly changing, amounts. Another technique can be to produce a number of different copolymeric materials from the same or different reactive monomers. By this technique, increasing and decreasing relative amounts of comonomers can produce a series of polymeric materials having preferably gradually changing indices of refraction, even if the same monomers are used to make a chemically similar (in that identical comonomers are used) but structurally different (in that different amounts of the same comonomers are used) end copolymer. Alternatively, different index of refraction materials may be prepared using any combination of these techniques, or none of them, but one or more other techniques, e.g., by simply selecting materials of any diverse chemistry or composition that have indices of refraction that are near to each other and that can be placed into multiple layers having changing, e.g., monotonically increasing or decreasing, indices of refraction.

In one embodiment of the invention, a multilayer composite has a first layer of a first index of refraction, a second layer of a higher index of refraction, and one or more intermediate layers between the first and second layers having one or more indices of refraction that are between the indices of refraction of the first and second layers. An example of such an embodiment can be a three or more layer multilayer optical adhesive composite. The two outermost layers of the multilayer adhesive can be adhesive layers, and between the outer layers can be one or more adhesive or other polymeric layers. Another embodiment may be an optical product comprising optical component layers bonded together by two or more adhesive layers (i.e., a multilayer adhesive). The optical component layers can have a combination of optical and other properties intended for an optical composite, such as diffusivity, polarizing properties, clarity, transmissivity, reflectivity, etc. The optical components may be glass or polyester or another optically functional organic or inorganic material. The multilayer optical product may function, for example, as a conductive layer of a touch screen display comprising a conductive coated layer such as an indium-tin-oxide-coated on a polyester (e.g., polyethylene terephthalate or polyethylene naphthalene).

A specific embodiment of the invention is a multilayer, e.g., three or more layer, optical adhesive comprising layers of materials having indices of refraction that increase across the composite, e.g., monotonically. Two or more adhesive layers can be included in the multilayer adhesive, especially at outer layers, e.g., to bond to optical components. Non-adhesive layers can also be included in the multilayer optical adhesive. Examples of such composites can contain, 3, 5, or 10 or more layers of material having monotonically increasing indices of refraction, with outer layers being adhesive materials, and with interior layers preferably being polymeric adhesive or polymeric non-adhesive materials.

As used in the present description, the phrase "pressure sensitive adhesive," means an adhesive that displays permanent and aggressive tackiness to a wide variety of substrates after applying only light pressure. It has a four-fold balance of adhesion, cohesion, stretchiness, and elasticity, and is normally tacky at use temperatures, which is typically room temperature (i.e., about 20° C. to about 30° C.). A pressure sensitive adhesive also typically has an open time tack (i.e., period of time during which the adhesive is tacky at room temperature) on the order of days and often months or years. An accepted quantitative description of a pressure sensitive adhesive is given by the Dahlquist criterion line (as described in Handbook of Pressure Sensitive Adhesive Technology, Second Edition, D. Satas, ed., Van Nostrand Reinhold, New York, N.Y., 1989, pages 171–176), which indicates that materials having a storage modulus (G') of less than about $3 \times 10^5$ Pascals (measured at 10 radians/second at a temperature of about 20° C. to about 22° C.) typically have pressure sensitive adhesive properties while materials having a G' in excess of this value typically do not.

In one aspect, the invention relates to a multilayer optical composite comprising four or more layers including a first non-adhesive optical layer having an index of refraction $n_1$, an $i^{th}$ non-adhesive optical layer having an index of refraction $n_i$ greater than $n_1$, and a multilayer optical adhesive between the first layer and the $i^{th}$ layer, wherein indices of refraction of layers of the multilayer optical adhesive increase in the order of position from the first layer.

In another aspect, the invention relates to a multilayer optical article comprising a first optical component having an index of refraction $n_1$, a second optical component having an index of refraction $n_i$ greater than $n_1$, and a multilayer optical adhesive between the first optical component and the second optical component to reduce interfacial reflection between the first optical component and the second optical component, wherein the multilayer optical adhesive consists essentially of adhesive layers having indices of refraction that vary monotonically between $n_1$ and $n_i$.

In still another aspect, the invention relates to a multilayer optical adhesive comprising three or more layers comprising a first adhesive layer having an index of refraction $n_{a1}$, a second adhesive layer having an index of refraction $n_{ai}$, and a polymeric intermediate layer having an index of refraction between $n_{a1}$ and $n_{ai}$.

In still another aspect, the invention relates to a multilayer optical adhesive comprising three or more adhesive layers having indices of refraction that vary monotonically between the outermost adhesive layers.

In still another aspect, the invention relates to a method of reducing reflectivity between two optical layers. The method comprises providing two optical layers, layer 1 having an index of refraction $n_1$ and layer i having an index of refraction $n_i$, and which exhibit a reflectivity at an interface between the two optical layers, and providing two or more intermediate adhesive layers between layer $n_1$ and $n_i$, to form a multilayer optical composite, wherein the indices of refraction of intermediate adhesive layers is between $n_1$ and $n_i$, and the reflectivity of the multilayer optical composite is less than the reflectivity at the interface between the two optical layers.

In still another aspect, the invention relates to a method of producing a multilayer optical adhesive. The method includes arranging three or more layers of polymeric material into a composite comprising a first adhesive layer having an index of refraction $n_{a1}$, a second adhesive layer having an index of refraction $n_{ai}$, and a polymeric intermediate layer having an index of refraction between $n_{a1}$ and $n_{ai}$.

DETAILED DESCRIPTION

Figure 1:
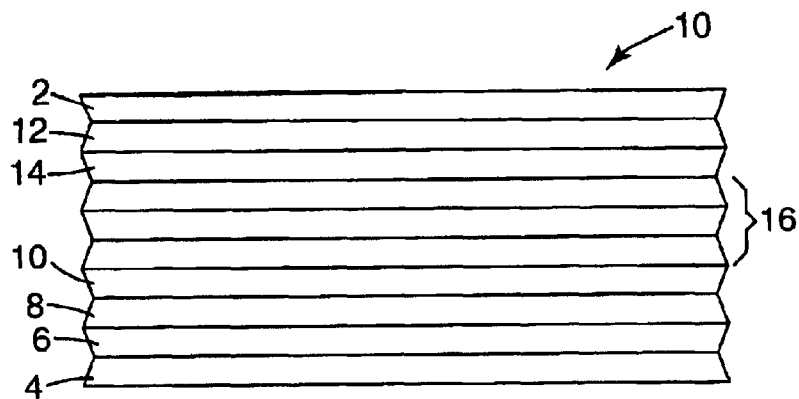
FIG. 1 illustrates an optical composite of the invention in the form of a multilayer optical adhesive.

Multilayer optical products of the invention comprise two layers, e.g., layer 1 and layer i, having different indices of refraction, and one or more, e.g., i-2, intermediate layers between layer 1 and layer i. The intermediate layer or layers can preferably have indices of refraction that increase between the indices of refraction of layer 1 and layer i according to the location of each layer within the composite. For more than one intermediate layer, the intermediate layer closest to layer 1 can have an index of refraction that is closest (among the refractive indices of the intermediate layers) to the index of refraction of layer 1, and the indices of refraction of the remaining layers can increase from there with each layer toward layer i.

Each layer of an optical product can be transmissive to desired wavelengths of electromagnetic radiation, e.g., visible light. Many useful optical products will relate to the visible spectrum, or possibly the ultraviolet or infrared. The present description will relate especially to the visible spectrum, but it is understood that this description and the claimed invention are not limited to any particular range of electromagnetic radiation when discussing transmissivity or reflectivity, and the invention can be applied to any range of wavelengths.

Transmissivities of optical products can vary over a large range depending on the type of optical product and its optical function. Polarizers, diffusing layers, and similar optical products may have transmissivities of 50 to 90 percent, sometimes higher or lower for visible light. Typical transmissivities of optical products designed for high transmissivity, clarity, and reduced distortion, in the visible range, can be in excess of 90 percent transmissive to visible light, e.g., to about 99 percent, or 99.5 percent transmissive or more. Layers of optical products can have any useful transmissivity, and for applications of desirably high visible wavelength transmissivities, clarity, and low distortion, can be preferably be 99 percent or 99.5 percent transmissivity to visible light or greater. Typical materials used for the layers may have minimal or no significant amount of absorbance of desired radiation. Assuming no absorbance, the percent reflectivity of an optical product is equal to 100 percent minus the percentage of light reflected (reflectivity).

Typical indices of refraction for optically transmissive materials may vary greatly depending on composition. Polymeric materials may exhibit refractive indices of from 1.4 to 1.5 (e.g., certain silicon polymers and polyacrylates) to 1.85 or 1.87 (e.g., for uniaxially oriented polyethylene naphthalene)—many pressure sensitive adhesives fall into this range, especially the low end of this range. Inorganic materials such as glass or an inorganic coating on any type of substrate, may have different ranges of indices of refraction. Organic glass can typically be from about 1.5 (e.g., 1.45–1.55) to about 1.7. Inorganic coatings can exhibit relatively higher indices of refraction such as range from about 1.5 or 1.8 up to 2.2 (indium tin oxide) or even higher (e.g., 2.4). A material's index of refraction is a common property that is measurable by well known methods, such as by using a refractometer (e.g., from Abbe). Indices of refraction are also catalogued. See, e.g., J. Brandup and E. H. Immergut, *Polymer Handbook* John Wiley and Sons, pp. 453–461 (3d ed. 1989).

In optical products, an interface between two different layers of different materials that contact each other, and that have different indices of refraction, causes reflectivity that reduces transmissivity. Radiation passing through one layer, reaching the interface, may be reflected back at the interface instead of transmitted through the next layer. When high transmissivity is desired, reflectance is not. The greater the difference in index of refraction of the two layers, the more reflectivity occurs.

The difference between indices of refraction of layers of optical products of the invention, e.g., layer 1 and layer i (this difference is sometimes referred to herein as $\Delta n$) can be relatively small or relatively large in terms of indices of refractions of transmissive solids, particularly those types of transmissive solids useful in optical products such as adhesives (e.g., polymeric adhesives), other polymeric materials, or inorganic materials such as glass or transmissive ceramics.

Exemplary differences between indices of refraction of layers 1 and i of an optical product will depend on the compositions of the two materials of the layers. For two different polymeric materials, the difference can be 0.1 or less, or may be up to a difference $\Delta n$ of 0.6, often 0.5 or 0.4. When one material is a polymeric material and the other is glass or an inorganic coating, the difference might be as great as 1.0. The higher this difference, the more reflectivity generally occurs when the materials are placed adjacent to each other in an optical product. The invention can substantially reduce reflectivity of any difference $\Delta n$, e.g., 0.1 or 0.6, up to 1.0, or even higher or lower differences. The invention can produce the most dramatic reductions in reflectivity when the difference in indices of refraction $\Delta n$ of two layers is relatively large, due to the relatively high amount of reflectivity that can occur in these configurations.

According to the invention, reflectance at one or more interfaces of a multilayer optical product can be reduced by arranging one or more intermediate layers between two layers with disparate indices of refraction. For example, intermediate layers can be arranged so the multilayer product contains adjacent layers, e.g., across the partial or entire thickness of the optical product, that have increasing or decreasing indices of refraction that are also between the indices of refraction of two layers with disparate indices of refraction. (The layers of the inventive composite are preferably in intimate contact with each other and preferably contain no trapped air or air bubbles.) Depending on the number of intermediate layers used and their particular compositions and indices of refraction, reflectivity between layers of a composite, e.g., between two optical component layers, may be substantially reduced (e.g., by at least 50%, preferably 80, or 90% or more) relative to the reflectivity of the two optical component layers being placed into direct contact with each other. Exemplary reflectivities that can be achieved in multilayer optical products according to the invention can be less than 0.001, e.g., as low as or below 0.004, preferably as low as or below 0.0002.

The indices of refraction of adjacent layers of a multilayer optical product can preferably be nearly but not exactly the same, to produce a gradual change in refractive indices between two layers having disparate refractive indices, and provide a substantial reduction in reflectivity. Although it is possible for adjacent layers to have the same index of refraction, such a configuration may be less preferable than slightly different, gradually changing indices of refraction. The difference between indices of refraction of adjacent layers does not have to change regularly, but substantially regular differences in indices of refraction of adjacent layers may be preferred.

As explained, less reflectivity will occur at interfaces of materials having similar (or the same) indices of refraction, i.e., a small difference in indices of refraction of adjacent layers, compared to the amount of reflectivity that would occur at interfaces of materials having a larger difference between their indices of refraction. Also, the index of refraction of each layer across a series of layers preferably increases with every layer across the multiple layers, e.g., entirely monotonically (see below), with no layers being out of the increasing trend; preferably, no layer deviates from a monotonically increasing relationship of indices of refraction and the multiple layers preferably consist of or consist essentially of entirely monotonically increasing layers. (Embodiments that consist essentially of monotonically increasing layers can include monotonically increasing layers and additionally may include layers or sublayers that do not substantially affect, e.g., increase, reflectivity of the composite—e.g., the reflectivity of the composite is still below the reflectivity, that would occur without at least some intermediate layers of monotonically varying refractive indices—or may contain layers or sublayers that do not substantially increase reflectivity at a single interlayer interface.) This can provide optimal reduction in reflectivity between layers 1 and i. On the other hand, it is also possible to include one or more layers within a multilayer product that do not have monotonically increasing indices of refraction, e.g., among other layers that do have monotonically changing indices of refraction, if the total reflectivity of the composite between layer 1 and layer i still is reduced compared to the reflectivity of layer 1 and layer i placed adjacent to each other. Any such arrangement, however, may normally be less preferred than composites consisting of or consisting essentially of layers of monotonically increasing indices of refraction between $n_1$ of layer 1 and $n_i$ of layer i.

Preferably, indices of refraction of layers of a multilayer composite can vary entirely monotonically. "Monotonically" varying indices of refraction refers to layers wherein the indices of refraction increase (or decrease if proceeding in the other direction) going from layer 1 to layer i, based on the position of each layer within the multilayer composite, so the composite contains a series of layers arranged to have consecutively increasing indices of refraction. As an example, FIG. 1 illustrates a multilayer composite 10 having i layers. Layer i, designated 4, has the lowest index of refraction, $n_1$, and layer i, designated 2, has the highest index of refraction, $n_i$. Layer 2, designated 6, has an index of refraction $n_2$ that is greater than $n_1$ but less than $n_3$ of layer 3, designated 8. Layer 3 has an index of refraction $n_3$ that is greater than $n_2$ but less than $n_4$ of layer 4, designated 10. Layer i-1, designated 12, has an index of refraction $n_{i-1}$ that is greater than $n_{i-2}$ of layer i-2, designated 14, but less than $n_i$ of layer i. Intermediate layers, collectively designated 16, e.g., layers 5 through layer i-2, would have indices of refraction that monotonically increase between $n_4$ and $n_{i-1}$. Composite 10 preferably consists of i layers of monotonically increasing refractive indices. As stated, however, one or more intermediate layers may deviate from this trend if desired and if the overall reflectivity between layers 1 and i is still useful or reduced due to a sufficient number, e.g., 2 or more, of monotonically varying intermediate layers.

The amount of variation in indices of refraction across a total or partial multilayer optical product, and between two adjacent layers, can be any useful variations depending on such factors as the total difference $\Delta n$ in refractive index of across outlying layers (e.g., a layer 1 and a layer i), the total number of layers or intermediate layers, and the compositions and functions of the different layers. Preferred optical products can contain a sufficient number of intermediate layers so that refractive indices vary gradually from one layer to adjacent layers, to most effectively reduce reflectivity at interfaces. The total number of layers in a composite can depend on various factors. For small differences in index of refraction between a layer 1 and a layer i, e.g., a $\Delta n$ in the range from less than 0.1 or from 0.1 to about 0.5, a relatively small number of total composite layers may be required, e.g., 3 or 5, but more may be useful. For a larger $\Delta n$, e.g., 0.5 to 1.0, a total number of 5 or more layers, or 10 or more layers may be preferred to provide a gradual change in indices of refraction along the layers of the multilayer product. The upper amount of number of layers can be limited by factors such as the complexity or cost of processing techniques in making multilayer products, or complexity or cost of precisely producing materials having very small differences in their indices of refraction. In certain embodiments of multilayer optical adhesives, the difference in refractive indes of any two adjacent layers can be no greater than 0.05, e.g., no greater than 0.02.

Layers of a multilayer optical product can be comprised of any layers that provide sufficient optical properties, e.g., transmissivity, clarity, or other desired optical or mechanical properties. The layers should also work together to produce a multilayer product that exhibits good interlayer adhesion.

Layers can be made of polymeric materials such as polymeric adhesives, polymeric non-adhesives (e.g., for mechanical strength or support), or inorganic materials such as glass, ceramics, or polycarbonates (especially for optical component layers). In addition to desired optical properties such as clarity and transmissivity, the layers may exhibit other desired properties including mechanical properties such desired strength, modulus, stability; or adhesive properties such as properties associated with a pressure sensitive adhesive or a structural adhesive. Multilayer products can contain polymeric layers with adhesive properties, e.g., pressure sensitive adhesive properties, structural adhesives, hybrids of these, or combinations of one or more of these types of adhesive layers in a composite. In particular embodiments of the invention, a multilayer product or a portion of a multilayer product can adhere to one or two optical component layers. Outer layers can exhibit adhesive properties, e.g., pressure sensitive adhesive properties or can be optical components. One or more interior layers can preferably exhibit adhesive properties, but adhesive properties are not necessary for all layers, as long as the multiple layers stay together in the form of a multilayer product, i.e., the product has useful interlayer adhesion.

Many useful materials are known to exhibit optical and mechanical properties, as will be understood to be useful in layers of a composite.

Examples of optical layers may be prepared from materials that comprise organic polymers (e.g., homopolymers or copolymers, etc.) or inorganic materials such as glass, ceramic, inorganic coatings such as metal oxide coatings, or polycarbonate. Many such useful optical materials are known, including non-adhesive optical component layers that act as support layers, polarizing layers, diffusing layers, reflective layers, transmissive layers that provide strength or support, conductive layers, antireflective layers, etc. These non-adhesive layers often have disparate indices of refraction, and therefore can typically be included as optical component layers at one or two outer layers of a multilayer optical product, e.g., layer 1 or layer i, with intermediate layers (e.g., a multilayer optical adhesive) between to reduce reflectivity. However, non-adhesive layers may also be used as intermediate layers if desired, or between two separate low reflectivity multilayer products.

Any type of glass or optical ceramic can be used as a non-adhesive optical component, e.g., for support. Polymeric materials such as polyester (e.g., polyethylene naphthalate (PEN), polyethylene terephthalate, and the like), polyacrylates, polycarbonates, or other stiff or rigid materials such as film materials and polymeric materials. Polycarbonate layers may typically be used at a thickness in the range from about one or three millimeters up to any larger thickness; and polyacrylates such as polymethyl methacrylate, for example, can be useful at a thickness of at least about one to three millimeters up to any larger thickness. Typical indices of refraction of such materials may be above about 1.4, e.g., between about 1.48 and 1.6.

A non-adhesive or optical component layer may include an optical coating layer, a conductive coating layer, or another type of coating layer. Examples of coated optical layers include glass or polyester coated with a conductive layer such as indium tin oxide (ITO).

Exemplary adhesive layers can be made of materials known to exhibit properties of structural adhesives, pressure sensitive adhesives, or hybrids of structural and pressure sensitive adhesives. An adhesive may be curable by various methods such as UV radiation, e-beam radiation, heat, etc.

One specific class of polymer that may be useful as an optical adhesive can include (meth)acrylate polymers, i.e., poly(meth)acrylates ("(meth)acrylate" refers collectively to methacrylates and acrylates), prepared by polymerizing (meth)acrylate monomers. Polymers prepared from one or more of (meth)acrylate monomers, optionally with any one or more of a variety of other useful monomers, will be referred to collectively as "polyacrylates." The polymers can be homopolymers or copolymers, optionally in combination with other, non-(meth)acrylate, e.g., vinyl-unsaturated, monomers. Such polyacrylate polymers and their monomers are well-known in the polymer and adhesive arts, as are methods of preparing the monomers and polymers. See, e.g., Applicants' copending U.S. patent application Ser. No. 10/005,669 (filed Nov. 2, 2001) and entitled "Hybrid Adhesives, Articles, and Methods," the entire disclosure of which is incorporated herein by reference. One of skill will understand and recognize that such polymers can be useful as pressure sensitive adhesives, and will understand their use in providing an adhesive layer of an optical composite as described herein.

Specific examples of polyacrylate polymers useful according to the invention include those prepared from free-radically polymerizable acrylate monomers or oligomers such as described in U.S. Pat. No. 6,288,172 and WO 01/30933, the disclosures of which are incorporated herein by reference. Examples of useful (meth)acrylate monomers for preparing a poly(meth)acrylate pressure sensitive adhesives with different refractive indexes include specifically, but not exclusively, the following classes:

Class A—includes acrylic acid esters of an alkyl alcohol (preferably a non-tertiary alcohol), the alcohol containing from 1 to 14 (preferably from 4 to 10) carbon atoms and include, for example, sec-butyl acrylate, n-butyl acrylate, isoamyl acrylate, 2-methylbutyl acrylate, 4-methyl-2-pentyl acrylate, 2-ethylhexyl acrylate, isooctyl acrylate, isononyl acrylate, isodecyl methacrylate, dodecyl acrylate, tetradecyl acrylate and mixtures thereof. Of these, isooctyl acrylate, n-butyl acrylate and 2-ethylhexyl acrylate can be preferred. As homopolymers, these (meth)acrylate esters generally have glass transition temperatures of below about −20 degree. C.

Class B—includes (meth)acrylate or other vinyl monomers which, as homopolymers, have glass transition temperatures of greater than about −20 degrees C., for example, methyl (meth)acrylate, ethyl (meth)acrylate, isopropyl (meth)acrylate, tert-butyl acrylate, isobornyl (meth)acrylate, butyl methacrylate, vinyl acetate, vinyl esters, acrylonitrile, and the like, may be used in conjunction with one or more other (meth)acrylate monomers, preferably to provide a polymer having a glass transition temperature below about −10 degree C., optionally and preferably also to achieve useful pressure sensitive adhesive and optical properties.

Class C-includes polar monomers such as acrylic acid, methacrylic acid, itaconic acid, crotonic acid, maleic acid, fumaric acid, sulfoethyl methacrylate, N-vinyl pyrrolidone, N-vinyl caprolactam, 2-vinyl-4,4-dimethyl-2-oxazolidinone, t-butyl acrylamide, dimethyl amino ethyl acrylamide, N-octyl acrylamide, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxyethyl) ammonium propionate betaine, trimethylamine methacrylimide, 1,1-dimethyl-1-(2,3-dihydroxypropyl)amine methacrylimide, mixtures thereof, and the like. Preferred polar monomers include those selected from the group consisting of monoolefinic monocarboxylic acids, monoolefinic dicarboxylic acids, acrylamides, N-substituted acrylamides, salts thereof, and mixtures thereof. Examples of such preferred polar monomers include but are not limited to those selected from the group consisting of acrylic acid, sodium acrylate, N-vinyl pyrrolidone, and mixtures thereof. (meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl (meth) acrylates.

Class D (Low refractive index monomers)—To prepare pressure sensitive adhesive with refractive index lower than the poly(meth)acrylate pressure sensitive adhesives, which typically have refractive indices of about 1.46 to about 1.48, fluorinated acrylate or methacrylate monomers are used to copolymerize with the Class A, B and C monomers. Such fluorinated (meth)acrylate monomers form polymers having refractive indices in the range of about 1.34 to about 1.44 depending on the chain length and/or degree of branching of the fluoroalkyl substituents of these monomers. Examples of useful fluorinated acrylate or methacrylate monomers include pentadecafluorooctyl acrylate, unadecafluorohexyl acrylate, nonafluoropentyl acrylate, heptafluorobutyl acrylate, octafluoropentyl acrylate, pentafluoropropyl acrylate, trifluoroacrylate, triisofluoroisopropyl methacrylate, and trifluoroethyl methacrylate.

Class E (High refractive index monomers)—Poly(meth) acrylate pressure sensitive adhesive with refractive indices higher than 1.47 can be preferably prepared from free radically polymerizable monomers having cycloaliphatic, substituted cycloaliphatic, aromatic or substituted aromatic substituents. The homopolymers of such free radically polymerizable monomers generally have refractive indices in the range of about 1.49 to about 1.65. Useful examples of such free radically polymerizable monomers include 3-methylcyclohexyl methacrylate, 4-methylcyclohexyl methacrylate, 2-methylcyclohexyl methacrylate, bornyl methacrylate, cyclohexyl methacrylate, 1-methylcyclohexyl methacrylate, 2-chlorocyclohexyl methacrylate, benzyl methacrylate, phenoxy methacrylate, polyphenyl methacrylate, α-methyl styrene, styrene, vinyl neononate, halogenated methacrylates, 2-chlorocyclohexyl methacrylate, 2-bromoethyl methacrylate and the like. Other aromatic monomers suitable in the present invention include, but are not limited to, 6-(4,6-dibromo-2-isopropyl phenoxy)-1-hexyl acrylate, 6-(4,6 dibromo-2-sec-butyl phenoxy)-1-hexyl acrylate, 2,6-dibromo-4-nonylphenyl acrylate, 2,6 dibromo-4-dodecyl phenyl acrylate, 2-(1-naphthyloxy)-I-ethyl acrylate, 2-(2 naphthyloxy)-I-ethyl acrylate, 6-(I-naphthyloxy)-1-hexyl acrylate, 6-(2-naphthyloxy)-1 hexyl acrylate, 8-(I-naphthyloxy)-1-octyl acrylate, 8-(2-naphthyloxy)-1-octyl acrylate, 2 phenylthio-I-ethyl acrylate, and phenoxy ethyl acrylate. The aromatic high refractive index monomers are described in the WO 01/30933.

Class F (Nano-particles)—The poly(meth)acrylate pressure sensitive adhesive compositions can also include nano-particles. The nano-particles can be selected to alter one or more property of the poly(meth)acrylate pressure sensitive adhesives, for example, refractive index, and adhesive strength. The particles are particularly useful for refractive index enhancement. Useful nano-particles include, for example, silica and metal oxide particles from metals such as zirconia, titania, ceria, and combinations thereof. Preferably, the particles have an average particle size less than about 200 nm, preferably less than about 100 nm, more preferably less than 50 nm, most preferably from about 10 to about 30 nm. In some embodiments, it is preferred to have particles having an average particle size less than about 20 nm. If the particles are agglomerated, the agglomerated particle size is within any of these preferable ranges. Examples of useful commercially available silicas include nano-sized colloidal silicas available from Nalco Chemical Co., Naperville, Ill., under the product designations NALCO COLLOIDAL SILICAS 1040, 1050, 1060, 2327, and 2329. Useful metal oxide sols include colloidal $ZrO_2$, suitable examples of which are described in U.S. Pat. No. 5,037,579 and incorporated herein, and colloidal $TiO_2$, suitable examples of which are described in PCT Application Serial No. US9815843, entitled, "Nanosize Metal Oxide Particles for Producing Transparent Metal Oxide Colloids and Ceramers," (Arney et al.) filed Jul. 30, 1998, which is incorporated herein by reference.

Class G (Crosslinkers)—In order to increase cohesive strength of the poly(meth)acrylate pressure sensitive adhesives, a crosslinking additive may be incorporated into the PSAs. Two main types of crosslinking additives are commonly used. The first crosslinking additive is a thermal crosslinking additive such as a multifunctional aziridine. One example is 1, I'-(1,3-phenylene dicarbonyl)-bis-(2-methylaziridine) (CAS No. 76522-644), referred to herein as "Bisamide". Such chemical crosslinkers can be added into solvent-based PSAs after polymerization and activated by heat during oven drying of the coated adhesive. In another embodiment, chemical crosslinkers which rely upon free radicals to carry out the crosslinking reaction may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide reagent. The second type of chemical crosslinker is a photosensitive crosslinker which is activated by high intensity ultraviolet (UV) light. Two common photosensitive crosslinkers used for hot melt acrylic PSAs are benzophenone and copolymerizable aromatic ketone monomers as described in U.S. Pat. No. 4,737,559. Another photocrosslinker, which can be post-added to the solution polymer and activated by UV light is a triazine, for example, 2,4-bis(trichloromethyl)-64-methoxy-pheynl)-s-triazine. These crosslinkers are activated by UV light generated from artificial sources such as medium pressure mercury lamps or a UV blacklight. Hydrolyzable, free-radically copolymerizable crosslinkers, such as monoethylenic ally unsaturated mono-, di-, and trialkoxy silane compounds including, but not limited to, methacryloxypropyltritncthoxysilane (available from Gelest, Inc., Tullytown, Pa.), vinyldimethylethoxysilane, vinylmethyl diethoxysi lane, vinyltriethoxysilane, vinyltrimethoxysilane, vinyltriphenoxysilane, and the like, are also useful crosslinking agents. Multi-functional acrylates are useful for bulk or emulsion polymerization. Examples of useful multi-functional acrylate crosslinking agents include, but are not In Z' limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof. Crosslinking may also be achieved using high energy electromagnetic radiation such as gamma or e-beam radiation. In this case, no crosslinker may be required.

Class H (Additives)—Following copolymerization, other additives may be blended with the resultant poly(meth) acrylate pressure sensitive adhesives. For example, compatible tackifiers and/or plasticizers may be added to aid in optimizing the ultimate tack and peel properties of the PSA. The use of such tack-modifiers is common in the art, as is described in the Handbook of Pressure-Sensitive Adhesive Technology, edited by Donatas Satas (1982). Examples of useful tackifiers include, but are not limited to, rosin, rosin derivatives, polyterpene resins, coumarone-indene resins, and the like. Plasticizers which may be added to the adhesive of the invention may be selected from a wide variety of commercially available materials. In each case, the added plasticizer must be compatible with the PSA. Representative plasticizers include polyoxyethylene aryl ether, dialkyl adipate, 2-ethylhexyl diphenyl phosphate, t-butylphenyl diphenyl phosphate, d1(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate Class I—macromeric (meth)acrylates such as (meth) acrylate-terminated styrene oligomers and (meth)acrylate-terminated polyethers, such as are described in PCT Patent Application WO 84/03837 and European Patent Application EP 140941;

Very generally and without limitation, examples of refractive indices of many polyacrylate adhesive materials can be adjusted by known methods such as by adding high refractive index nano-particles as described in Class F, and by varying the composition of their monomeric materials, e.g., by producing copolymers including a variety of (meth) acrylate or other unsaturated comonomers, as described in Classes D and E.

Polymerization Method

Poly(meth)acrylate pressure sensitive adhesives useful in this invention can be polymerized by conventional free-radical polymerization methods. Suitable methods of polymerization include solution polymerization, suspension polymerization, emulsion polymerization, and bulk polymerization.

Structural and structural hybrid adhesives may also be used, alone or in combination with pressure sensitive adhesives, in a layer of the composite. Structural and structural hybrid adhesives may include one or a combination of well known curable materials such as epoxies, polyurethanes, acrylates, or combinations of these.

Exemplary epoxy materials are described in U.S. Pat. No. 5,252,694 at col. 4, line 30 thru col. 5, line 34, the entire description of which is incorporated herein by reference. Preferred epoxy monomers can include cycloaliphatic, aliphatic, cyclic, and aromatic epoxy monomers. Important examples include bisphenol A and bisphenol F epoxies such as those commercially available under the trade names EPON 828, EPON 1001F, and EPONEX Resin 1510 commercially available from Shell Chemicals, Houston, Tex. Important examples of cycloaliphatic epoxy monomers include the ERL series of cycloahipatic epoxy monomers such as ERL-4221 or ERL-4206, commercially available from Union Carbide, Danbury, Conn.

Other polymers or polymeric materials may be included in layers of the composite, without necessarily functioning as an adhesive. These materials can be included to provide, e.g., mechanical properties, conductivity, and optical functionalities such as diffusion, color. Examples of polymeric materials include, but are not limited to plastic films such as polypropylene, polyethylene, polyvinyl chloride, polyester (polyethylene terephthalate), polycarbonate, polymethyl (meth)acrylate (PMMA), polyurethane, cellulose acetate, cellulose triacetate, ethyl cellulose, diffuse film, metallized polymeric film and ceramic sheet materials.

According to the invention, a number of different materials having preferably gradually varying indices of refraction will be necessary for the different layers of a multilayer optical product. It will be understood that a variety of different methods are available for producing different materials having varying, preferably closely varying, indices of refraction. One example of varying an index of refraction of a polymer is described in Applicants' U.S. patent application Ser. No. 09/605,500, entitled "High Refractive Index Pressure-Sensitive Adhesives," filed Jun. 28, 2000, the disclosure of which is incorporated herein by reference.

By one method, many different materials may be selected as different layers of a multilayer product based only on their specific index of refraction, to produce two or more, preferably a series of, layers having gradually changing indices of refraction. In such a composition, the chemical composition of adjacent layers may be similar or dissimilar, and layers may be organic or inorganic.

More preferred methods of producing polymeric materials having closely varying indices of refraction can be used by starting with monomers, polymeric materials, or inorganic materials, of different, similar, or identical composition, and combining the starting materials in different amounts, e.g., gradually changing amounts, to produce multiple polymeric materials with preferably gradually changing indices of refraction.

One method of varying the indices of refraction of polymeric layers can be to start with a single polymeric component and add larger amounts of a refractive index-modifying additive, such as another polymer, monomer, or inorganic additive.

As one example, two or possibly more different polymeric materials, optionally adhesives, preferably miscible or compatible, having different indices of refraction, can be starting materials. The index of refraction of each pure material may be selected to match an index of refraction of a different layer of a composite, such as optical component layers, e.g., layer 1 and layer i. To produce intermediate layers (e.g., layers 2 through i-1) having gradually varying indices of refraction, the two polymeric materials can be combined, mixed, or blended in gradually different amounts. As only an example, a multilayer product having seven layers may have optical component layers 1 and 7 of indices of refraction $n_1$ and $n_7$, with $n_1$ being lower than $n_7$. Five intermediate layers can be prepared from a first polymeric having an index of refraction $n_2$ that is slightly greater than $n_1$, and a second polymeric material having an index of refraction ($n_6$) slightly less than $n_7$. Layer 2, adjacent to layer I, can be pure first polymer and layer 6 can be pure second polymer. Layers 3, 4, and 5 can be blends of the first and second polymers of varying compositions between 100 percent first polymer and 100 percent second polymer, preferably to give regular differences in the layers' indices of refraction, e.g., 75/25, 50/50, and 25/75, of the first polymer to the second polymer, respectively. If more intermediate layers are used, the relative amounts of first polymer and second polymer can be varied by smaller increments.

A different example can be to start with a single polymeric composition, e.g., homopolymer, copolymer, or combination, preferably an adhesive, and add increasing amounts of a different material that will slightly alter the refractive index of the polymer such as another polymer, a low molecular weight organic additive, or an inorganic additive (e.g., nanoparticles), to preferably gradually alter the refractive index of the combined material. A first intermediate layer (e.g., layer 2) can contain no additive or a relatively low amount of additive. The amount of additive can be gradually, preferably regularly increased to raise (or lower) the index of refraction for materials of layers of the multilayer product. A single example of nanoparticles that can be useful in the manner is are described in U.S. Pat. No. 6,416,838, at Example 65.

Yet another method for producing multiple polymeric materials having varying indices refraction can be to produce layers of chemically similar copolymers from varying amounts of two or more different comonomers. A first homopolymer or copolymer can be produced with a single monomer or a first monomer and a comonomer. The first monomer, typically present in a major amount, can be a known polymerizable monomer such as an acrylate or methacrylate monomer. A small amount of a polymerizable comonomer can be added to alter the index of refraction of the polymer. The comonomer can be any polymerizable material that can affect the index of refraction of the polymer while maintaining otherwise desirable optical and (preferably) adhesive properties. Optionally, the comonomer can be what is sometimes referred to as a high index of refraction comonomer, as described in Class E, which includes different types of halogenated (e.g., brominated) aromatic (meth)acrylate monomers (see, e.g., WO 01/30933 A1), and as a low index of refraction comonomer, as described in Class D. A series of copolymers can be produced with each copolymer having a slightly larger amount of the comonomer, such as a high index of refraction comonomer, to gradually increase the index of refraction of the consecutive copolymeric compositions. In this manner, a number of layers can be produced where a monomeric or copolymeric material matches or approximates a first index of refraction (of a first layer such as a first optical component layer), and indices of refraction gradually, preferably monotonically, increase or decrease to match or approximate another index of refraction (e.g., of a distant layer such as a second optical component layer).

Combinations of these or other techniques of producing polymeric materials for layers of varying refractive indices can be used, and may in fact be necessary, to produce multiple layers of refractive indices that approximate or match disparate indices of refraction of two optical component layers. Specifically, if pressure sensitive adhesive layers are included in an optical composite, these often have indices of refraction below about 1.6. Addition of additives such as other polymers, comonomers, or inorganic materials that increase index of refraction may reduce pressure sensitive adhesive properties.

Thickness of polymeric adhesive layers or other polymeric layers may be any useful thicknesses, but should be greater than the wavelength of light to be transmitted through the layer, preferably much greater, e.g., at least 10 or 100 times greater. Thicknesses of the individual layers of a composite may in some embodiments of the invention desirably be reduced or minimized to provide desired optical properties and to prevent the multilayer product from becoming unduly thick. Useful thicknesses of individual layers can be in the range from submicron thicknesses, e.g., several hundred nanometers, or one or several microns, and may be up to 1 mil or 10 mils thick per layer. The total thickness of an optical product will depend on the total thickness of each layer and the total number of layers, and may be from less than 1 mil, to 1 mil, up to 10 or 20 or 30 mils, for example.

Referring to FIG. 1, this illustrates an embodiment of a multilayer optical product 10 having i layers of preferably monotonically varying indices of refraction. Layer 1 (4) has an index of refraction ni and layer i (2) has an index of refraction ni that is greater than $n_1$. Other layers 1 and n may be adhesive layers or non-adhesive layers. Layers 2 through i-1 preferably all have refractive indices between $n_1$ and $n_i$, preferably increasing monotonically from layer 1 to layer 2, through layer 3 to layer i-1, and to layer i. Layers 2 through i-1 contain enough adhesive layers to adhere the overall multi layer product together in the form of a multilayer optical product. While ten layers are illustrated, the multilayer product may be a multilayer optical adhesive (if layers 1 and n are adhesives) having a value of i from 3 up to any practical limit. In practice, a value of i equal to 10 can provide a very substantially reduced reflectivity, and values of i greater than 10 may be used and sometimes preferred, but do not provide a substantially greater reduction in reflectivity beyond i=10. If desired or necessary, the multilayer product 10 may also contain two or more multilayer (e.g., 3- or more layer) products of monotonically varying indices of refraction, bonded to or separated by or interrupted by one or more layers having a non-monotonic refractive index, although this may not be preferred because it would at least slightly counteract the reduction in reflectivity produced by the monotonically varying intermediate layers.

Figure 2:
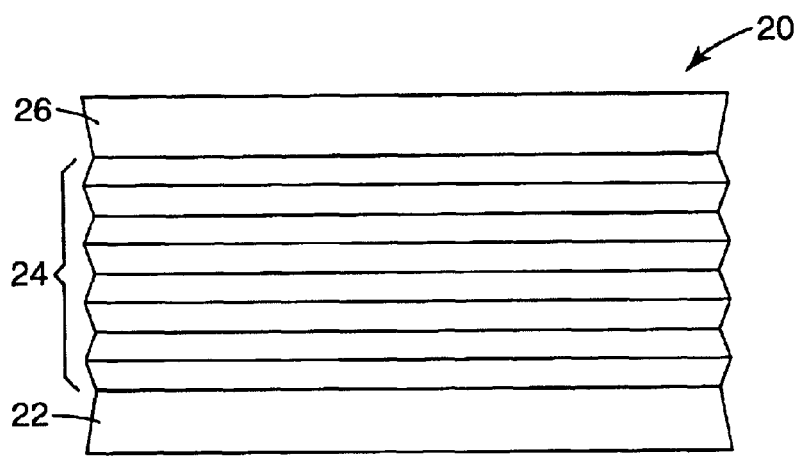
FIG. 2 illustrates a multilayer optical product of the invention in the form of two optical components bonded together with a multilayer optical adhesive.

FIG. 2 illustrates a specific embodiment of a multilayer product of the invention. Optical product 20 comprises optical component layer 22 bonded to optical component layer 26 by multilayer optical adhesive 24. Multilayer optical adhesive 24 may comprise two or preferably more layers, giving the total product 20 at least 4 layers. The optical component layers 22 and 26 can be any of a variety of polarizing, diffusing, reflective, or transmissive layers of an inorganic (e.g., glass or ceramic) or organic (PET, PEN, or polycarbonate) material, optionally coated with a reflective, antireflective, or conductive layer. Preferred optical component layers can be highly transmissive in the visible spectrum, e.g., greater than 99 percent or 99.5 percent transmissive, to provide high visible transmissivity, low distortion, low haloing, and high clarity. The layers of the multilayer optical adhesive can consist of polymeric layers having monotonically varying indices of refraction that reduce reflectivity that would otherwise exist if optical component layers 22 and 26 were placed together. Multilayer optical adhesive 24 can preferably contain 7 or more, e.g., 10 polymeric layers having monotonically varying indices of refraction, with a sufficient number of the layers having sufficient pressure sensitive or structural adhesive properties placed at locations to bond optical component layers 22 and 26 together with good interlayer adhesion for the entire multilayer product.

Figure 3:
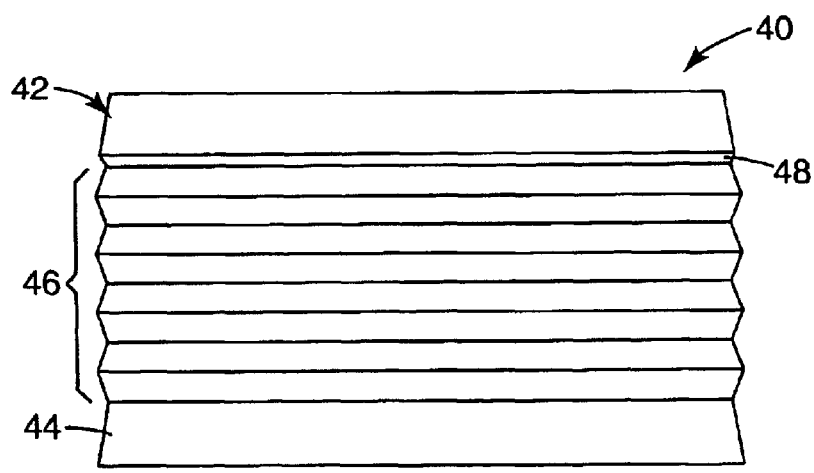
FIG. 3 illustrates a specific multilayer optical product in the form of a conductive layer bonded using a multilayer optical adhesive to another transmissive layer, to produce a conductive composite for use in a touch screen display.

A specific embodiment of a conductive multilayer optical product is illustrated in FIG. 3, which can be useful in a touch panel electronic display. Multilayer optical product 40 comprises conductive layer 48 disposed on a surface of substrate 42, which can preferably be PET. The material of the conductive layer may be any conductive material layer, generally an inorganic layer such as a metal oxide, such as indium tin oxide. Multilayer optical adhesive 46 bonds conductive layer 48 to optical component layer 44, which can be any optical component such as glass, polycarbonate, or polymethyl methacrylate. Multilayer optical adhesive 46 can preferably contain at least 7 or 10 polymeric, inorganic, or adhesive layers, including a sufficient number of adhesive layers to bond optical component layers 42 and 46 with good interlayer adhesion. Also preferably, multilayer optical adhesive 46 can consist of or consist essentially of layers of refractive indices that vary monotonically between the indices of refraction of optical component layers 42 and 44. The reflectivity otherwise cause by the interface of the optical component layers is decreased and transmissivity is increased.

The multilayer optical products of the invention can be prepared by methods that will be understood by the skilled artisan. As an example, multiple layers of materials can be prepared from any materials having a desired series of refractive indices. These layers can be arranged monotonically (but as noted, may include one or more layers of a non-monotonic index of refraction). Organic and inorganic, adhesive or non-adhesive layers can be arranged to produce useful inter-layer adhesion. Polymeric and adhesive layers can be prepared by producing a polymeric or adhesive layer, e.g., by coating or casting and solvent evaporation, by hot-melt methods, by various extrusion, blown extrusion, co-extrusion methods, or other known methods, as desired or useful. Adhesive or non-adhesive organic polymeric or inorganic layers can be laminated together before or after curing, as appropriate to create a useful amount of inter-layer adhesion.

Known co-extrusion methods may also be used to prepare multi-layer materials having multiple layers of similar or dissimilar heat processable polymeric materials, by extruding different materials through a multiple port (e.g., slot) or multi-layer die. These methods can be useful to produce multilayer composites of different materials, with good interlayer adhesion. Such methods are limited, however, in that multi-material extrusion dies in practice allow co-extrusion of a limited number of materials, such as four or fewer, typically at most. It is possible to bond such 3 or 4 layer composites together by lamination or with tie-layers or adhesive layers, to produce composites of greater than 4 layers.

Alternatively, layer after layer of sequential material having monotonically increasing refractive indices may be extruded or cast upon layers of lower refractive index, to produce a composite of any number of layers.

Methods of bonding single or multilayer adhesive materials to optical component layers are well known, and include lamination, casting or coating, or single or multi-layer extrusion processes.

Combinations and variations of these methods can be used to produce composites of endless varieties and amounts of optical composite layers adjacent to adhesive or other structural layers.

The methods and components of the invention of this description can find applications wherever transmissivity and avoidance of reflectivity between optical components of other optical layers is desired. Preferred embodiments allow bonding of optical components with disparate indices of refraction, using a multilayer optical adhesive component that both bonds the optical components and reduced reflectivity otherwise caused by the interface between the optical components, or that would exist by using only a single layer of optical adhesive, as is a common practice. Certain examples of specific applications can be to produce a transmissive and conductive composite for a touch screen displays, as shown in FIG. 3. Many other applications will be apparent to the skilled artisan.

EXAMPLES

These examples are merely for illustrative purposes only and are not meant to be limiting on the scope of the appended claims. All parts, percentages, ratios, etc. in the examples and the rest of the specification are by weight unless indicated otherwise.

| Table of Abbreviations | |
|---|---|
| Abbreviation or Name | Description |
| AA | Acrylic Acid |
| 2-EHA | 2-ethyl Hexyl Acrylate |
| NOEA | Naphthyloxy Ethyl Acrylate prepared according to WO 01/30932 |
| MEK | Methyl ethyl ketone |
| VAZO 67 | 2,2'-azobis(2-methyl butanenitrile) commercially available from E.I Du Pont De Nemours and Company; Wilmington, DE |
| PET | polyester film of polyethylene terephthalate having a thickness of 38 micrometers (1.5 mils) |
| Release Liner | T-10 release liner available from CP Films Inc |

Test Methods

Transmission (% T), Reflectance (% R), and Specular Reflectance (% RS) were measured using a Perkin Elmer Spectrophotometer Model Lambda 900. Absorption (% A) was calculated according to the equation: % A=100%−% T−% R.

Synthesis Samples

A series of 5 PSA samples were prepared by varying the composition ratio of 2-EHA/NOEA/AA. The PSA samples, PSA-1–PSA-5 were prepared by a solution polymerization method with the reagents shown in Table 1 using the following procedure. All components were weighed into a glass bottle. The contents of the bottles were deoxygenated by purging with nitrogen at a flow rate of one liter per minute for 1 minute. The bottles were sealed and placed in a rotating water bath at 57° C. for 24 hours to effect essentially complete polymerization. Polymer solutions were tested for % solids. The polymer solutions were coated onto a Release Liner and dried in 70° C. oven for 15 minutes to provide a dry coating thickness of 5–8 micrometers. The coated film was equilibrated under conditions of about 23° C. and 50% relative humidity.

TABLE 1

| PSA Number | Composition Ratio 2EHA/NOEA/AA | MEK (g) | VAZO 67 (g) | 2-EHA (g) | NOEA (g) | AA (g) |
|---|---|---|---|---|---|---|
| PSA-1 | 78/20/2 | 20 | 0.03 | 11.7 | 3.0 | 0.3 |
| PSA-2 | 58/40/2 | 20 | 0.03 | 8.7 | 6.0 | 0.3 |
| PSA-3 | 38/60/2 | 20 | 0.03 | 5.7 | 9.0 | 0.3 |
| PSA-4 | 18/80/2 | 20 | 0.03 | 2.7 | 12.0 | 0.3 |
| PSA-5 | 0/98/2 | 20 | 0.03 | 0.0 | 14.7 | 0.3 |

Preparation of Laminates

Samples of each of the PSA samples PSA-1–PSA-5, were laminated to PET to generate laminates LAM-1–LAM-5, and the refractive index was measured for each using an Abbe Refractometer (manufactured by Erma Inc. of Tokyo, Japan and distributed by Fisher Scientific). The refractive indices for these laminates is shown in Table 2

TABLE 2

| Laminate Number | Adhesive Composition 2-EHA/NOEA/AA (parts) | Refractive Index |
|---|---|---|
| LAM-1 | 78/20/2 | 1.498 |
| LAM-2 | 58/40/2 | 1.524 |
| LAM-3 | 38/60/2 | 1.554 |
| LAM-4 | 18/80/2 | 1.582 |
| LAM-5 | 0/98/2 | 1.610 |

Example 1

A multilayer sample (Example 1) was prepared by laminating the highest refractive index adhesive sample (PSA-5) to PET film, removing the Release Liner and laminating the next highest refractive index adhesive on top and continuing consecutively until all 5 adhesives had been laminated. Percent transmission (% T) and percent reflectance (% R) were measured, as described above, in the wavelength ranges of 400–700 nm and 600–700 nm. Measurements were made with the light source incident on the adhesive side of the sample. Percent absorption (% A) was calculated as described above. The Luminous Transmission for the laminate was determined using the test method described above with 2 different light sources with the light incident on the adhesive side rather than the PET side. The data for the multilayer laminate (Example 1) as well as for the laminates LAM-1–LAM-5 are presented in Table 3. Specular Reflectance (% RS) was measured as described above by sand blasting and painting black the PET side of each laminate to eliminate second surface reflection. These data for the multilayer laminate (Example 1) and for the laminates LAM-1–LAM-5 are shown in Table 4

TABLE 3

| Example | 400–700 nm | | | 600–700 nm | | |
|---|---|---|---|---|---|---|
| | % T | % R | % A | % T | % R | % A |
| LAM-1 | 92.21 | 7.71 | 0.08 | 92.40 | 7.58 | 0.02 |
| LAM-2 | 91.86 | 7.98 | 0.17 | 92.04 | 7.94 | 0.02 |
| LAM-3 | 91.28 | 8.42 | 0.30 | 91.45 | 8.45 | 0.09 |
| LAM-4 | 91.04 | 8.88 | 0.08 | 91.29 | 8.81 | −0.09 |
| LAM-5 | 90.46 | 9.32 | 0.22 | 90.79 | 9.22 | −0.01 |
| Example 1 | 91.79 | 7.68 | 0.53 | 92.24 | 7.50 | 0.26 |

TABLE 4

| Example | % RS (400–700 nm) | % RS (600–700 nm) |
|---|---|---|
| LAM-1 | 3.65 | 3.58 |
| LAM-2 | 3.90 | 3.77 |
| LAM-3 | 4.32 | 4.15 |
| LAM-4 | 4.83 | 4.60 |
| LAM-5 | 5.23 | 4.99 |
| Example 1 | 3.55 | 3.42 |

What is claimed is:

1. A multilayer optical composite comprising four or more layers including
   a first non-adhesive optical layer having an index of refraction $n_1$,
   an $i^{th}$ non-adhesive optical layer having an index of refraction $n_i$ greater than $n_1$, and
   a multilayer optical adhesive between the first layer and the ith layer, wherein the indices of refraction of the layers of the multilayer optical adhesive increase between $n_1$ and $n_i$ in the order of position from the first layer.

2. The A multilayer composite comprising four or more layers including
   a first non-adhesive optical layer having an index of refraction $n_1$,
   an $i^{th}$ non-adhesive optical layer having an index of refraction $n_i$ greater than $n_1$, and
   a multilayer optical adhesive comprises comprising at least three or more adhesive layers between the first layer and the $i^{th}$ layer, wherein the indices of refraction of the layers of the multilayer optical adhesive increase between $n_1$ and $n_i$ in the order of position from the first layer.

3. The composite of claim 2 consisting essentially of
   the first layer with index of refraction $n_1$,
   the $i^{th}$ layer with index of refraction $n_i$, and
   a multilayer optical adhesive consisting essentially of from 3 to 20 polymeric layers having indices of refraction monotonically changing between $n_1$ and $n_i$ based on the position of the polymeric layer from the first layer.

4. The composite of claim 1 wherein the multilayer optical adhesive consists essentially of
   a first adhesive layer adjacent to the first non-adhesive optical layer
   an $x^{th}$ adhesive layer adjacent to the ith non-adhesive optical layer, and
   x-2 polymeric layers between the first adhesive layer and the xth adhesive layer.

5. The composite of claim 4 wherein x is from 3 to 18.

6. The composite of claim 2 wherein the multilayer optical adhesive comprises 10 or more layers each having an index of refraction between $n_1$ and $n_i$, and the difference between the refractive indices of any two adjacent layers is no greater than 0.02.

7. The composite of claim 2 wherein the multilayer optical adhesive consists of 10 or more layers having monotonically varying indices of refraction between $n_1$ and $n_i$, and the difference between the refractive indices of any two adjacent layers is no greater than 0.02.

8. The composite of claim 2 wherein
   the multilayer optical adhesive comprises 5 or more layers,
   the difference between $n_1$ and $n_i$ is at least 0.2, and
   the reflectivity of the composite is less than 0.0004.

9. The composite of claim 2 wherein
   the multilayer optical adhesive comprises 5 or more layers,
   the difference between $n_1$ and $n_i$ is at least 0.4, and
   the reflectivity of the composite is less than 0.0004.

10. The composite of claim 9 wherein
    the multi layer optical adhesive comprises 10 or more layers,
    the difference between $n_1$ and $n_i$ is at least 0.4, and
    the reflectivity of the composite is less than 0.0002.

11. A multilayer composite comprising four or more layers including
    a first non-adhesive optical layer having an index of refraction $n_1$,
    an $i^{th}$ non-adhesive optical layer having an index of refraction $n_i$ greater than $n_1$, and
    a multilayer optical adhesive between the first layer and the $i^{th}$ layer, wherein the indices of refraction of the layers of the multilayer optical adhesive increase between $n_1$ and $n_i$ in the order of position from the first layer, wherein the first layer and the $i^{th}$ layer are non-adhesive optical component layers comprising material selected from an organic polymeric material and a glass material, and $n_1$ is below about 1.6 and $n_i$ is greater than about 1.6.

12. The composite of claim 11 wherein $n_1$ is below about 1.5 and $n_i$ is greater than about 2.0.

13. The composite of claim 11 wherein the difference in indices of refraction of the first layer and the $i^{th}$ layer is at least 0.4, and the multilayer optical adhesive composite has 5 or more layers.

14. The composite of claim 11 wherein the difference in indices of refraction of the first layer and the $i^{th}$ layer is at least 0.5, and the multilayer optical adhesive composite has 10 or more layers.

15. The composite of claim 2 wherein
the multilayer optical adhesive composite consists essentially of 4 or more adhesive layers,
each layer of the multilayer optical adhesive comprises a blend of two common ingredients in different amounts that alter indices of refraction of the layers.

16. The composite of claim 15 wherein the common ingredients are a polymeric material and nanoparticles that alter the index of refraction of the polymeric material.

17. The composite of claim 15 wherein the common ingredients are two different polymeric materials.

18. The composite of claim 11 wherein
the multilayer optical adhesive composite consists essentially of 4 or more adhesive layers,
each adhesive layer comprises copolymer comprising two common monomeric units in different amounts that alter indices of refraction of the layers.

19. A touch screen display comprising a conductive layer and a multilayer composite comprising four or more layers including
a first non-adhesive optical layer having an index of refraction $n_1$,
an $i^{th}$ non-adhesive optical layer having an index of refraction $n_i$ greater than $n_1$, and
a multilayer optical adhesive between the first layer and the $i^{th}$ layer, wherein the indices of refraction of the layers of the multilayer optical adhesive increase between $n_1$ and $n_i$ in the order of position from the first layer.

20. A multilayer optical article comprising
a first optical component having an index of refraction $n_1$,
a second optical component having an index of refraction $n_i$ greater than $n_1$, and
a multilayer optical adhesive between the first optical component and the second optical component to reduce interfacial reflection between the first optical component and the second optical component,
wherein the multilayer optical adhesive consists essentially of 5 to 15 adhesive layers having indices of refraction that vary increase monotonically between $n_1$ and $n_i$.

21. A multilayer optical adhesive comprising three or more layers comprising
a first adhesive layer having an index of refraction $n_{a1}$,
a second adhesive layer having an index of refraction $n_{ai}$, and
a polymeric intermediate layer having an index of refraction between $n_{a1}$ and $n_{ai}$.

22. The multilayer optical adhesive of claim 21 consisting essentially of from 3 to 20 adhesive layers arranged monotonically based on index of refraction.

23. A multilayer optical adhesive comprising 3 or more adhesive layers having indices of refraction that vary monotonically between the outermost adhesive layers.

24. The multilayer optical adhesive of claim 23 consisting essentially of from 5 to 20 adhesive layers having monotonically varying indices of refraction.

25. The multilayer optical adhesive of claim 23 consisting essentially of from 9 to 15 adhesive layers.

26. The multilayer optical adhesive of claim 23 consisting of from 5 to 20 adhesive layers having monotonically varying indices of refraction.

27. The multilayer optical adhesive of claim 23 consisting of from 9 to 15 adhesive layers having monotonically varying indices of refraction.

28. A method of reducing reflectivity between two optical layers, the method comprising
providing two optical layers, layer 1 having an index of refraction $n_1$ and layer i having an index of refraction $n_i$, greater than $n_1$ and which exhibit a reflectivity at an interface between the two optical layers,
providing two or more intermediate adhesive layers between layer $n_1$ and $n_i$, to form a multilayer optical composite,
wherein the indices of refraction of intermediate adhesive layers are between $n_1$ and $n_i$, they increase monotonically from layer 1 to layer i, and the reflectivity of the multilayer optical composite is less than the reflectivity at the interface between the two optical layers without the intermediate adhesive layers.

29. The method of claim 28 comprising providing a multilayer optical adhesive between layer $n_1$ and $n_i$, the multilayer optical adhesive comprising from 2 to 20 adhesive layers.

30. The method of claim 28 further comprising laminating layers of pressure sensitive adhesive together to form a multilayer optical adhesive which is used as the intermediate adhesive layers.

31. A method of producing a multilayer optical adhesive, the method comprising arranging three or more layers of polymeric material into a composite comprising
a first adhesive layer having an index of refraction $n_{a1}$,
a second adhesive layer having an index of refraction $n_{ai}$, and
a polymeric intermediate layer having an index of refraction between $n_{a1}$ and $n_{ai}$.

32. The method of claim 31 comprising arranging two or more polymeric intermediate layers between the first and second adhesive layers, each polymeric intermediate layer having an index of refraction between $n_{a1}$ and $n_{ai}$.

33. The method of claim 32 comprising arranging from 3 to 20 polymeric intermediate layers between the first and second adhesive layers, the polymeric intermediate layers having indices of refraction that vary monotonically between $n_{a1}$ and $n_{ai}$.

34. The method of claim 32 comprising arranging from 9 to 15 polymeric intermediate layers between the first and second adhesive layers, the polymeric intermediate layers having indices of refraction that vary monotonically between $n_{a1}$ and $n_{ai}$.

* * * * *

UNITED STATES PATENT AND TRADEMARK OFFICE
CERTIFICATE OF CORRECTION

PATENT NO. : 6,842,288 B1
DATED : January 11, 2005
INVENTOR(S) : Liu et al.

It is certified that error appears in the above-identified patent and that said Letters Patent is hereby corrected as shown below:

Column 7,
Line 61, delete "," after "reflectivity".

Column 8,
Line 19, delete "Layer i" and insert in place thereof -- Layer 1 --.
Line 61, delete "indes" and insert in place thereof -- index --.

Column 12,
Line 12, delete "TiO 2" and insert in place thereof -- $TiO_2$ --.
Line 25, delete "(CAS No. 76522-644)" and insert in place thereof -- (CAS No. 76522-64-4) --.
Lines 46-47, delete "2,4-bis(trichloromethyl)-64-methoxy-pheynl)-s-triazine" and insert in place thereof -- 2,4-bis(trichloromethyl)-6-(4-methoxy-phenyl)-s-triazine --.
Line 53, delete "methacryloxypropyltritncthoxysilane" and insert in place thereof -- methacryloxypropyltrimethoxysilane --.
Line 60, delete "In" and insert in place thereof -- in --.

Column 13,
Line 21, after "adipate" insert -- . --.
Line 57, delete "cycloahiphatic" and insert in place thereof -- cycloaliphatic --.

Column 14,
Lines 51-52, delete "layer I" and insert in place thereof -- layer 1 --.

Column 16,
Line 2, delete "ni" and insert in place thereof -- $n_1$ --.

UNITED STATES PATENT AND TRADEMARK OFFICE
CERTIFICATE OF CORRECTION

PATENT NO. : 6,842,288 B1
DATED : January 11, 2005
INVENTOR(S) : Liu et al.

It is certified that error appears in the above-identified patent and that said Letters Patent is hereby corrected as shown below:

Column 19,
Line 55, delete "ith" and insert in place thereof -- $i^{th}$ --.
Line 59, delete "The" before "A".
Line 66, delete "comprises".
Line 67, delete "or more adhesive".

Column 21,
Line 48, delete "vary".

Signed and Sealed this

Sixteenth Day of August, 2005

JON W. DUDAS
*Director of the United States Patent and Trademark Office*